US006422984B1

(12) United States Patent
Masham et al.

(10) Patent No.: US 6,422,984 B1
(45) Date of Patent: Jul. 23, 2002

(54) MAGNETIC ROLL FOR USE IN XEROGRAPHIC PRINTING

(75) Inventors: Roger D. Masham, Herts; Claire Dawn Ireland, Hazlemere, both of (GB)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/503,835

(22) Filed: Feb. 15, 2000

(51) Int. Cl.[7] .......... B23D 15/00

(52) U.S. Cl. .......... 492/8; 399/277

(58) Field of Search .......... 492/8; 399/277

(56) References Cited

U.S. PATENT DOCUMENTS

| | | | | | |
|---|---|---|---|---|---|
| 4,142,281 | A | * | 3/1979 | Muller | 492/8 |
| 4,266,328 | A | * | 5/1981 | Harada et al. | 492/8 |
| 4,517,719 | A | * | 5/1985 | Okumura et al. | 492/8 |
| 4,608,737 | A | * | 9/1986 | Parks et al. | 492/8 |
| 6,021,296 | A | * | 2/2000 | Tamura et al. | 492/8 |
| 6,012,841 | A | * | 8/2000 | Genovese | 492/8 |

* cited by examiner

*Primary Examiner*—I Cuda Rosenbaum
(74) *Attorney, Agent, or Firm*—R. Hutter

(57) ABSTRACT

A magnetic roll, such as for use in a xerographic printing apparatus, is formed from two semicylindrical partial cylinders. The partial cylinders can be molded and attached to each other to form a complete cylinder defining magnetic poles along the circumference thereof.

8 Claims, 5 Drawing Sheets

FIG. 3
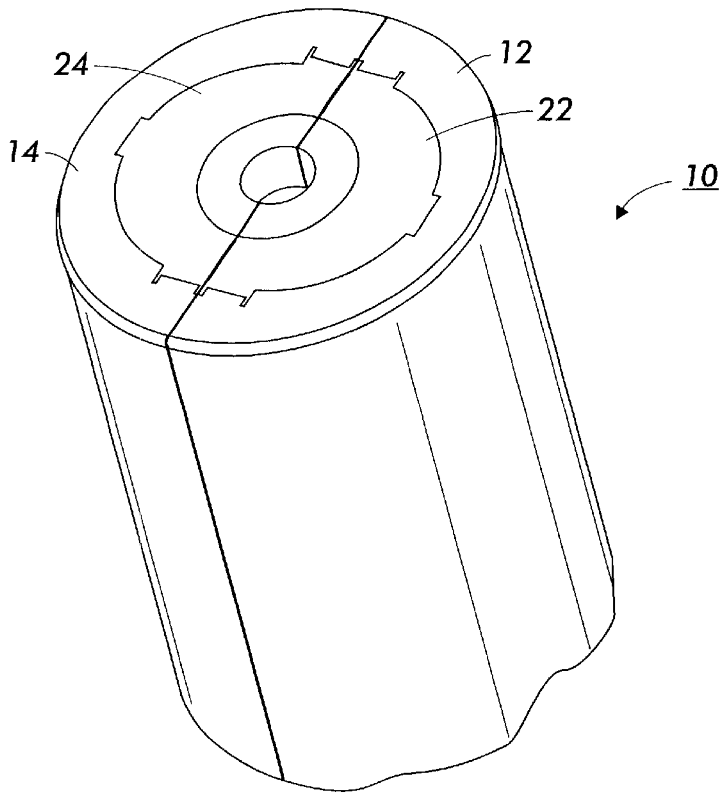
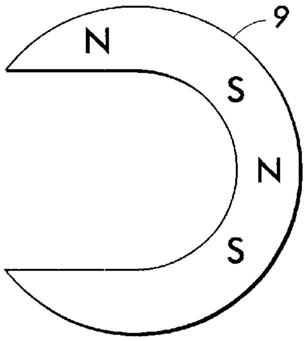
FIG. 4
PRIOR ART

FIG. 6
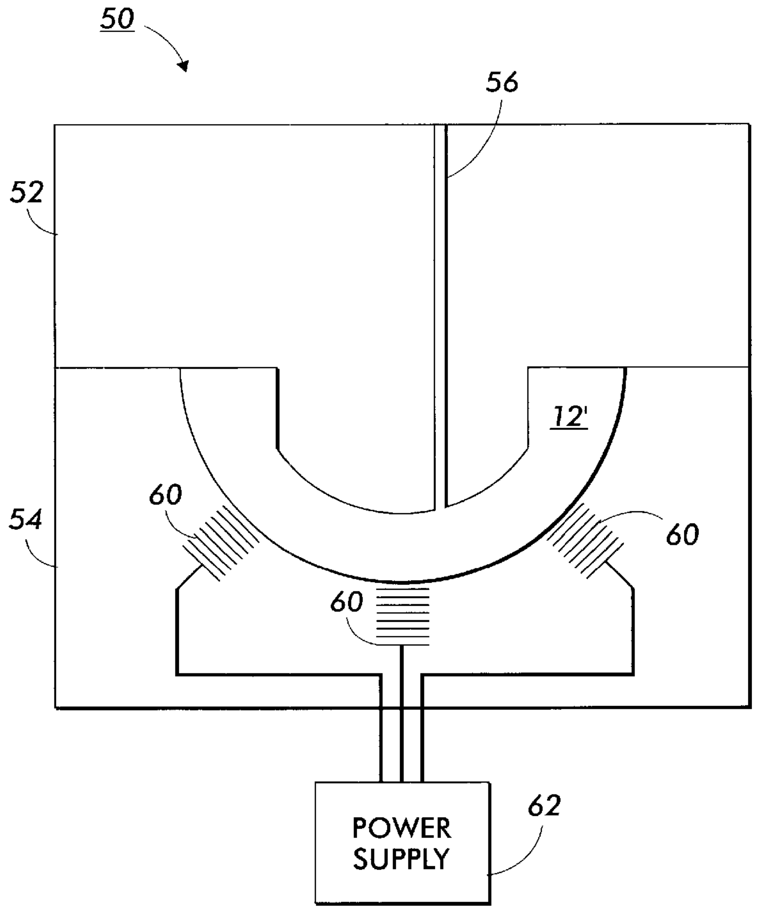
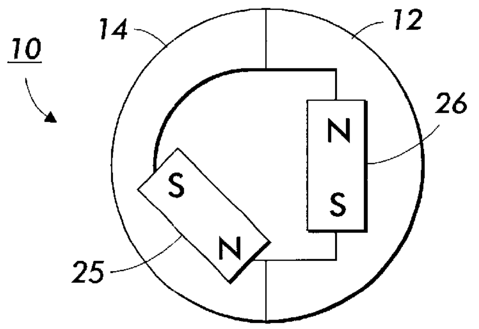
FIG. 7

MAGNETIC ROLL FOR USE IN XEROGRAPHIC PRINTING

FIELD OF THE INVENTION

The present invention relates to the construction of a magnetic roll for use in a processing station of an electrostatographic printing machine.

BACKGROUND OF THE INVENTION

In the well-known process of electrostatographic printing, which includes xerographic printing and copying, a charge-receptive member is initially uniformly charged, and portions of the member are discharged according to an image desired to be printed. The imagewise-discharged areas form an electrostatic latent image. This latent image is subsequently developed by applying a fine toner to the charge-receptive member, the toner adhering to those areas of the latent image which are charged in a particular way. The developed image is then transferred to a sheet, yielding a print of a desired image. Following transfer, any remaining toner on the charge-receptive member is cleaned from the charge-receptive member.

In many common designs of electrostatographic printing machines, magnetic rolls are employed in the developing station and the cleaning station. Typically, the magnetic roll includes a stationary magnet having a rotating tube or sleeve positioned concentrically thereabout. The magnetic roll defines a series of longitudinal magnetic poles arranged in alternating fashion around the circumference thereof. When the sleeve is rotated around the stationary magnetic roll, developer material (which typically includes toner and a magnetically-permeable carrier) is held by the magnetic poles to the sleeve and conveyed on the surface of the sleeve toward the charge-receptive member.

The present invention is directed toward the construction of a magnetic roll for use in an electrostatographic printer.

DESCRIPTION OF THE PRIOR ART

In the prior art, U.S. Pat. No. 4,638,281 discloses a magnetic roll which includes a central carrier, in the form of a cylinder having a set of strip-shaped cavities along longitudes thereof. Permanent magnetic components are placed in the strip-shaped cavities.

U.S. Pat. No. 4,823,102 discloses a magnetic roll having a central portion with a plurality of spaced fins extending radially therefrom. A magnet is secured in each space between adjacent fins.

U.S. Pat. No. 5,570,167 discloses a technique for molding a magnetic roll. A molten resin containing magnetic particles is injected into a mold cavity, while magnetic lines of force are applied.

U.S. Pat. No. 5,740,509 discloses a magnetic roll including a columnar magnet with a D-shaped central bore. The D-shaped bore causes one portion of the magnet to have a particularly strong magnetic pole relative to other magnetic poles along the circumference.

U.S. Pat. No. 5,894,004 discloses a mold for manufacturing a magnetic roll. The mold includes a body and an insert, which are used to provide specific configurations of magnetic poles in the finished roller.

SUMMARY OF THE INVENTION

According to one aspect of the present invention, there is provided a method of making a magnetic roll suitable for use in developing an electrostatic latent image. A first partial cylinder is provided, defining a first partial cylindrical surface. A second partial cylinder is provided, defining a second partial cylindrical surface. The first partial cylinder is attached to the second partial cylinder, thereby combining the first partial cylindrical surface with the second partial cylindrical surface. At least one magnetic pole is defined in a portion of the combined first partial cylindrical surface and second partial cylindrical surface.

According to another aspect of the present invention, there is provided a magnetic roll suitable for use in developing an electrostatic latent image. A first partial cylinder, defining a first partial cylindrical surface, is attached to a second partial cylinder, defining a second partial cylindrical surface, to yield a combined cylindrical surface. At least one magnetic pole is defined in a portion of the combined cylindrical surface.

BRIEF DESCRIPTION OF THE DRAWINGS

FIG. 3 is a perspective view showing a portion of a magnetic roll according to the present invention;

FIG. 4 is a sectional elevational view of a prior art magnetic roll;

FIG. 6 is a simplified sectional elevational view showing the creation of a partial cylinder of a magnetic roll according to the present invention by molding; and FIG. 7 is a sectional, elevational view of an embodiment of a magnetic roller according to the present invention.

DETAILED DESCRIPTION OF THE INVENTION

Figure 1:
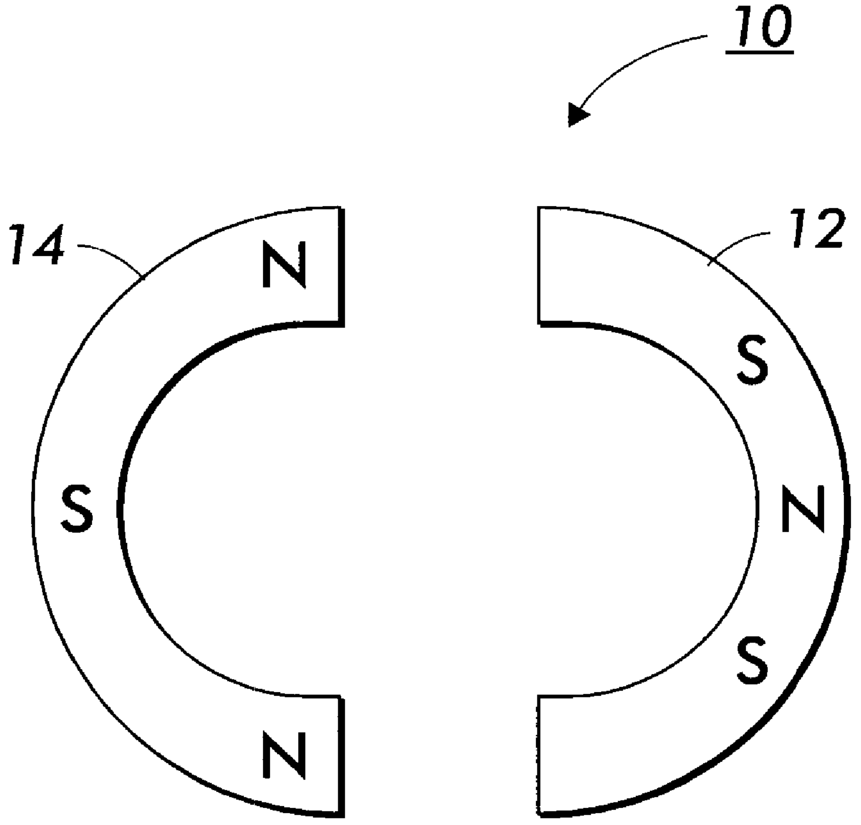
FIG. 1 is a sectional, elevational, exploded view of the partial cylinders of a magnetic roll according to the present invention.

FIG. 1 is a sectional elevational view showing, in exploded form, the essential portions of a magnetic roll made according to the present invention. As is well known, a magnetic roll is typically in the form of a cylinder, and in the sectional view of FIG. 1, a magnetic roll 10 comprises two partial cylinders, labeled respectively 12 and 14. Each partial cylinder 12 and 14 defines a partial cylindrical surface which is preferably almost perfectly a semicircle, and a corresponding concave surface. As shown, when the two partial cylinders 12 and 14 are attached so that their respective concave surfaces are facing each other, the outer surfaces of each partial cylinder are combined to form a complete cylinder, or at least a combined cylindrical surface forming at least a portion of a cylinder.

As is known in the art of magnetic rolls for electrostatographic printing, a preferred material for the partial cylinders 12 and 14 forming magnetic roll 10 is a moldable, curable resin in which magnetically-permeable particles are suspended. Either during or after the molding of the resin to form partial cylinders 12 and 14, magnetic fields are selectively applied to discrete areas of partial cylinders 12 and 14 to thereby create essentially permanent magnetic poles therein. The magnetic poles variously shown as N or S in FIG. 1 are shown for example purposes only, and the specific configuration (location and relative strength) of the various magnetic poles along the circumference of the magnetic roll 10 will depend on the requirements of a particular printing apparatus. Nonetheless, it is typically preferred, if not inevitable, that magnetic poles alter in polarity along the circumference of a magnetic roll 10 when the partial cylinders 12 and 14 are assembled.

Figure 2:
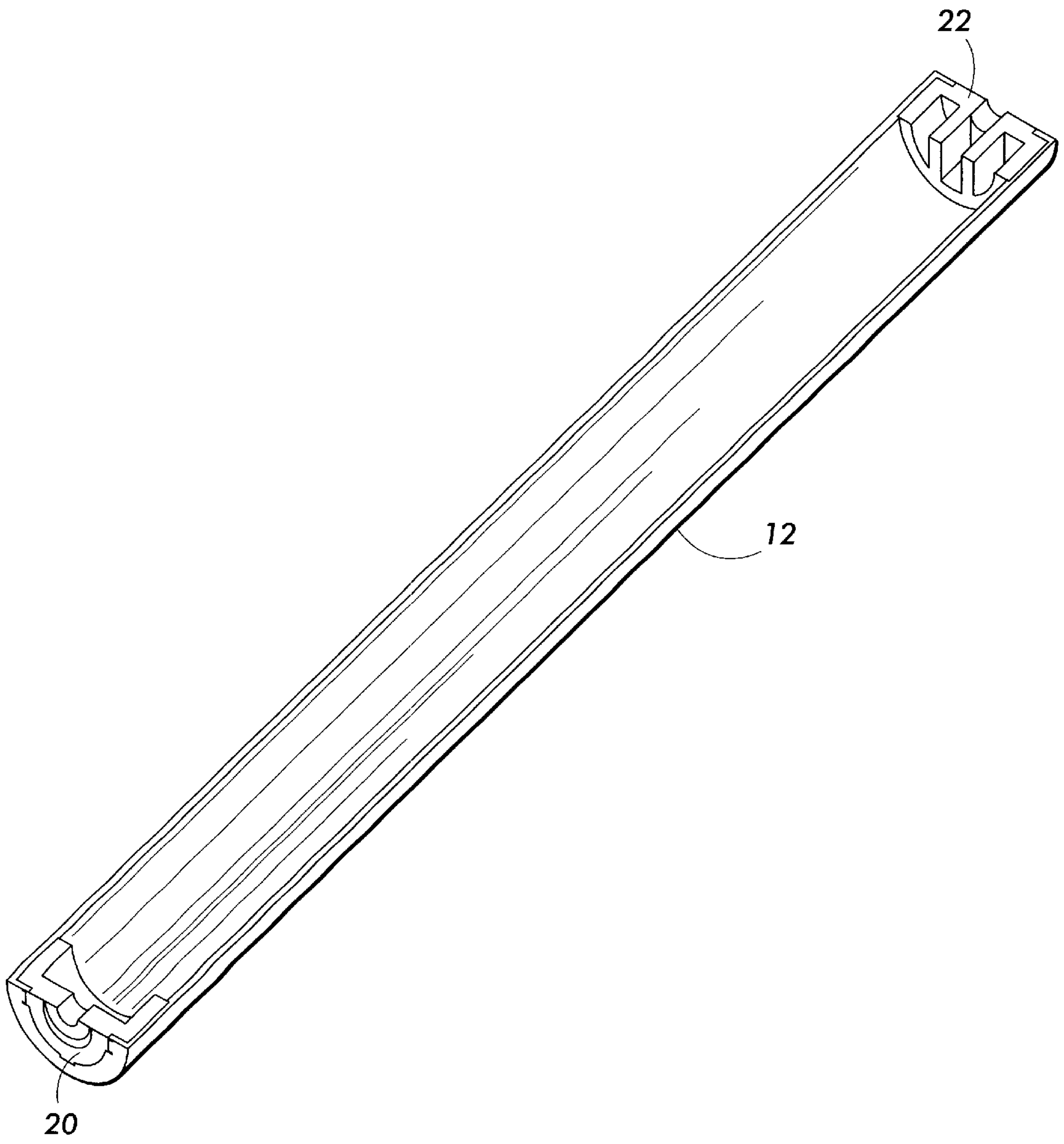
FIG. 2 is a perspective view showing, in isolation, one partial cylinder of a magnetic roll according to the present invention.

FIG. 2 is a perspective view, showing, in isolation, one partial cylinder of 12 of the magnetic roll 10 shown in FIG. 1. As can be seen, the partial cylinder 12, which is preferably a single piece of cured resin, is shaped to accommodate semicircular-shaped end caps 20, 22.

FIG. 3 is a perspective view showing an assembled magnetic roll 10, each end of which is formed by complementary semicircular end caps 22 and 24. As can be seen, small projections from each end cap 22, 24 can correspond to the concave surface of either partial cylinder 12 or 14, allowing the end caps 22, 24 to be secured within the assembled magnetic roll 10. The two partial cylinders 12, 14 may be attached by adhesive at their interfaces, or attached only at the interface between end caps 22, 24.

FIG. 4 is an elevational view of a prior art magnetic roll 9, which is formed from a single molded piece of resin, in which the magnetically-permeable particles suspended in the resin form a series of alternating poles around the circumference as shown. This prior-art magnetic roll 9, because it is formed from a single molded piece, must be designed to accommodate the opening and closing of the mold from which it was made, and therefore, this design is capable only of having an effective circumference of 270°.

Figure 5:
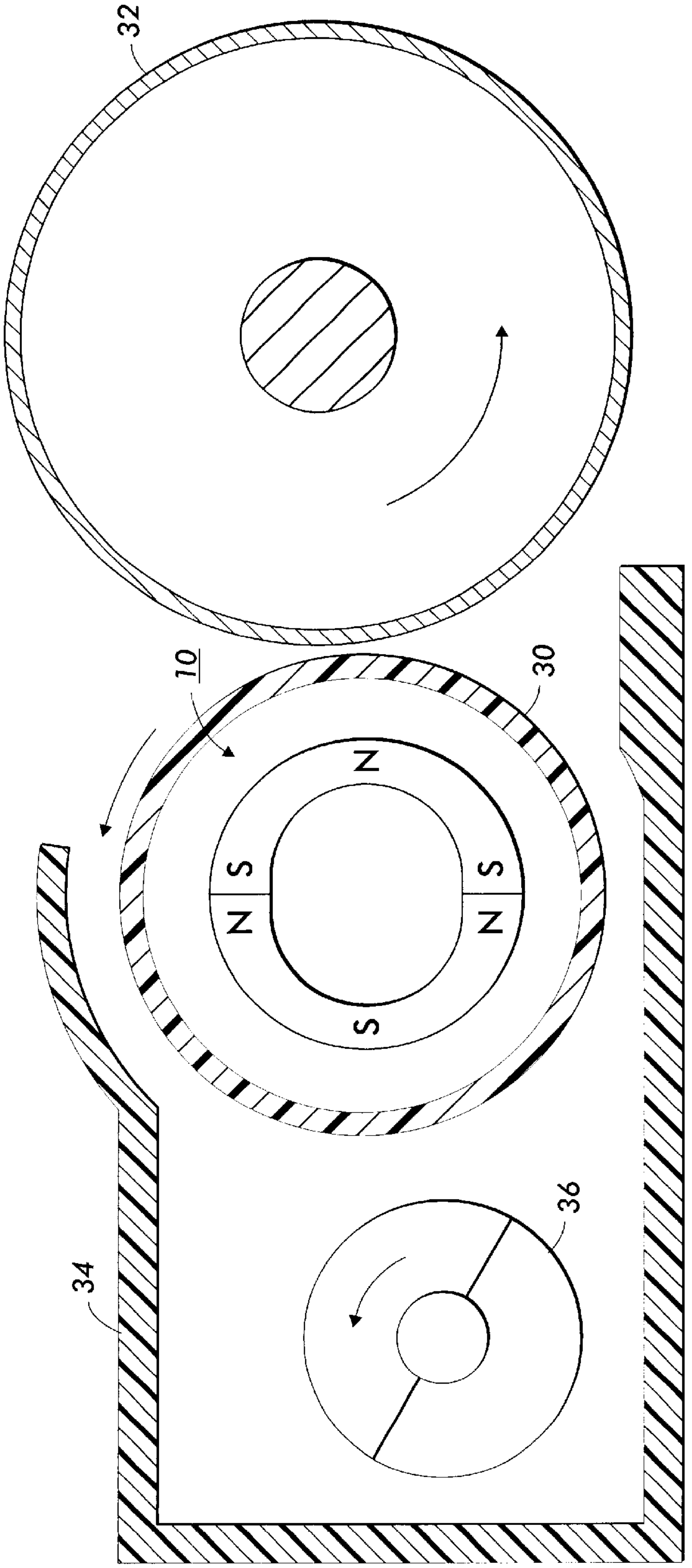
FIG. 5 is a simplified sectional elevational view showing the magnetic roll of the present invention and the context of an electrophotographic printer.

FIG. 5 is a simplified sectional elevational view showing some essential elements of a xerographic printer in which a magnetic roll 10 of the present invention may be used. As shown, the magnetic roll 10, according to the present invention, is disposed within a rotating sleeve 30 which is adjacent a rotating drum-type charge-retentive member (photoreceptor) 32, as is typically found in xerographic printing apparatus. The magnetic roll 10 and sleeve 30 are in turn disposed within a developer housing 34, of any design known in the art, which typically includes at least one auger such as 36. In this way, developer material, typically including toner particles and a magnetically-permeable carrier, is stirred by auger 36 and conveyed along the moving surface of sleeve 30 to develop a latent image on charge-receptive member 32. According to a preferred embodiment of the present invention, the poles on the assembled magnetic roll 10 should be disposed around the circumference of magnetic roll 10 so that one pole of a first polarity disposed in one partial cylinder is adjacent a second pole of an opposite polarity in the other partial cylinder. Even more preferably, there is a "crossover point" of radial or tangential magnetic poles (i.e., a location along the circumference where the magnetic flux is very low or zero) at each interface where partial cylinders 12 and 14 contact each other.

FIG. 6 is a simplified sectional elevational view of a mold 50, comprising a top portion 52 and lower portion 54, which together form a void at the interface thereof, this void having the negative shape corresponding to a cylindrical surface of a partial cylinder such as 12 of the magnetic roll according to the present invention. (There may or may not exist separate molds for each partial cylinder 12, 14.) Also shown in the drawing is an injection tube 56, for pouring liquid resin into the void 12', in a manner known in the art of injection molding: indeed, it may be more preferable to have the tube 56 disposed at one end of the void 12'.

Also shown in FIG. 6 are a set of electromagnets 60, which, according to one possible embodiment of a method according to the present invention, may be disposed within a portion 54 of mold 50. The electromagnets 60 are disposed to exert magnetic flux along specific longitudes in the outer surface of a partial cylinder 12 being created within the void 12', similar to any number of methods known in the art. The magnetic flux created by electromagnets 60 imparts permanent magnetic poles at discrete locations in the partial cylinder, either as the resin therein is cured or thereafter. The electromagnets 60 are connected to one or more power supplies such as 62.

As can be seen from FIG. 6, the semi-circular shape of partial cylinders such as 12 or 14 forming a particular magnetic roll 10 is readily conducive to injection molding. Unlike the prior art magnet in FIG. 4, by providing two such partial cylinders 12 and 14, and mechanically attaching them, the magnetic roll 10 of the present invention can exhibit magnetic polarity around its entire circumference, as opposed to the partial circumference of the prior art magnetic roll of FIG. 4.

Because it is possible to design each partial cylinder 12, 14, to have the same profile along the entire length thereof, it is also conceivable to manufacture each partial cylinder 12, 14 by an extrusion process. For purposes of the claims herein, an extrusion die (not shown) for making a partial cylinder can be considered a form of "mold."

According to the present invention, it is also conceivable to create a magnetic roll from more than the two complementary partial cylinders 12 and 14 shown in the illustrated embodiment: a magnetic roller such as 10 can be formed from three or more distinct partial cylinders, which together form the entire circumference of the magnetic roll. It is also possible that partial cylinders such as 12 and 14 need not be equal in arc, so that a partial cylinder such as 12 may in fact "cover" an arc of 270° of the total circumference of the roll, while the complementary partial cylinder 14 cover only 90° of the circumference. While it is probably easier to provide partial cylinders 12, 14 which are each half-cylinders, because the two partial cylinders could be physically identical, it may be desirable, from the perspective of precise placement of magnetic poles around the circumference of the roll, to modify the shapes and number of partial cylinders forming a complete magnetic roll 10.

It is also possible, according to the present invention, to cause magnetic poles to be formed in the partial cylinders by other means that the magnetization technique shown above. For instance, one could provide specially-shaped voids on the inner, concave surfaces of partial cylinders such as 12 and 14, and place discrete magnetic members in the voids, to result in the desired magnetic properties along the circumference of the magnetic roll. FIG. 7 shows an embodiment of a roller 10 according to the present invention, in which discrete, strip-shaped magnets such as 26, 28 are disposed within shaped voids on the interior of each partial cylinder 12, 14.

What is claimed is:

1. A magnetic roll suitable for use in developing an electrostatic latent image, comprising:

a first partial cylinder, the first partial cylinder defining a first partial cylindrical surface;

a second partial cylinder, the second partial cylinder defining a second partial cylindrical surface;

the first partial cylinder being attached to the second partial cylinder, to yield a complete cylindrical surface; and at least one magnetic pole defined in a partial cylinder of the complete cylindrical surface.

2. The roll of claim 1, wherein the first partial cylindrical surface and second partial cylindrical surface each define one-half of a cylindrical surface.

3. The roll of claim 1, wherein a first magnetic pole of a first polarity is defined at a predetermined location in the first partial cylinder;

a second magnetic pole of a second polarity opposite the first polarity is defined at a predetermined location in the second partial cylinder; and the first partial cylinder is attached to the second partial cylinder so that the first magnetic pole is adjacent the second magnetic pole.

4. The roll of claim 1, further comprising at least one discrete magnetic member disposed within the complete cylindrical surface.

5. The roll of claim 1, further comprising at least one end cap disposed at at least one end thereof.

6. The roll of claim 5, wherein the at least one end cap is substantially semicircular.

7. The roll of claim 1, wherein the first partial cylinder comprises a molded resin.

8. The roll of claim 7, wherein the resin includes magnetically permeable particles suspended therein.

* * * * *